United States Patent
Shi et al.

(10) Patent No.: US 11,148,512 B2
(45) Date of Patent: Oct. 19, 2021

(54) TRUCK BED COVER LOCKING DEVICE, TRUCK BED AND TRUCK

(71) Applicant: CHANGZHOU SUNWOOD INTERNATIONAL TRADING CO., LTD., Changzhou (CN)

(72) Inventors: Hang Shi, Changzhou (CN); Hongjuan Zheng, Changzhou (CN)

(73) Assignee: CHANGZHOU SUNWOOD INTERNATIONAL TRADING CO., LTD., Changzhou (CN)

( * ) Notice: Subject to any disclaimer, the term of this patent is extended or adjusted under 35 U.S.C. 154(b) by 197 days.

(21) Appl. No.: 16/581,774

(22) Filed: Sep. 25, 2019

(65) Prior Publication Data

US 2021/0031605 A1 Feb. 4, 2021

(30) Foreign Application Priority Data

Jul. 29, 2019 (CN) .......................... 201921208485.8

(51) Int. Cl.
*B60J 7/19* (2006.01)
*B60J 7/185* (2006.01)

(52) U.S. Cl.
CPC ................ *B60J 7/198* (2013.01); *B60J 7/185* (2013.01)

(58) Field of Classification Search
CPC ..................................................... B60J 7/198
USPC .................................................. 296/100.07
See application file for complete search history.

(56) References Cited

U.S. PATENT DOCUMENTS

| 6,719,353 | B1* | 4/2004 | Isler .......................... | B60J 7/102 296/100.16 |
| D915,267 | S  * | 4/2021 | Shi ............................... | D12/223 |
| 10,994,648 | B1* | 5/2021 | Luo ............................ | B60P 7/02 |
| 2002/0096268 | A1* | 7/2002 | Schmeichel .............. | B60P 7/04 160/328 |
| 2015/0069780 | A1* | 3/2015 | Xu .......................... | B60J 7/1607 296/100.17 |
| 2015/0123421 | A1* | 5/2015 | Combs, II ................ | B60J 7/198 296/100.02 |
| 2018/0345768 | A1* | 12/2018 | Frederick ................ | B60J 7/141 |
| 2019/0001800 | A1* | 1/2019 | Williamson .............. | B60P 7/00 |
| 2020/0324633 | A1* | 10/2020 | Shi .......................... | B60J 7/0084 |

(Continued)

FOREIGN PATENT DOCUMENTS

CN 208264090 U 12/2018

*Primary Examiner* — Jason S Morrow
(74) *Attorney, Agent, or Firm* — Bayramoglu Law Offices LLC

(57) ABSTRACT

A truck bed cover locking device includes a latch structure and a latch locking component. The latch structure is detachably mounted on a truck bed body. The latch structure includes a limit portion extending toward a latch locking component. The limit portion includes a limit surface and a tilted surface. The tilted surface is located above the limit surface. The tilted surface tilts downward in a direction approaching the latch locking component. The latch locking component is provided on the truck bed cover. The latch locking component includes a retractable plunger and a reset component. The plunger contacts the tilted surface at a point. Under the action of gravity, the plunger is compressed and slides downward. When the plunger slides to a position below the limit surface, at least a part of the plunger stretches out to a position below the limit surface under the action of the reset component.

17 Claims, 3 Drawing Sheets

(56) References Cited

U.S. PATENT DOCUMENTS

2020/0331329 A1\* 10/2020 Schmeichel ............ B60J 7/141
2021/0046812 A1\* 2/2021 Hawkins ................ B60J 7/1607
2021/0114446 A1\* 4/2021 Schmeichel ............ B60J 7/198
2021/0129641 A1\* 5/2021 Hawkins .................... B60J 7/14

\* cited by examiner

TRUCK BED COVER LOCKING DEVICE, TRUCK BED AND TRUCK

CROSS REFERENCE TO THE RELATED APPLICATIONS

This application is based upon and claims priority to Chinese Patent Application No. CN 201921208485.8, filed on Jul. 29, 2019, the entire contents of which are incorporated herein by reference.

TECHNICAL FIELD

The present disclosure relates to the field of automobiles and more specifically to a truck bed cover locking device, a truck bed and a truck.

BACKGROUND

A light truck is a very handy vehicle for transportation and the truck includes an enclosed cab and an open truck bed. The open truck bed can be used to conveniently stow various goods. Since the truck bed is open, a truck bed cover is needed to cover the truck bed.

The existing truck bed cover system for covering the truck bed generally includes a covering layer for covering the truck bed. A front end of the covering layer is connected to a front frame edge. A rear end of the covering layer is connected to a rear frame edge. In use, the rear frame edge is pulled backward. The covering layer covers the truck bed and then two ends of the front frame edge are fixed on a fixing mechanism, so as to ensure the covering layer covers the truck bed. The rear frame edge of the covering layer is generally provided with a locking mechanism to be fixedly connected to the truck bed cover and the truck bed.

For example, the Chinese patent with the application number CN201820779862.2 discloses a locking structure of a foldable pickup truck bed cover which includes vertical frames mounted on the truck bed. A horizontal frame is provided between the vertical frames. The truck bed cover of the foldable pickup truck overlays the vertical frames and the horizontal frame. A spring bolt base is provided on an end surface of the horizontal frame. A spring bolt capable of sliding and reciprocating along the spring bolt base is provided inside the spring bolt base. A spring is provided inside the spring bolt. A tail end of the spring bolt is provided with a pull component. The locking structure further includes a locking plate fixed with the truck bed. A front end of the spring bolt can extend into the spring plate to realize locking and unlocking. The locking mechanism of the above-mentioned application can lock the truck bed while the truck bed is not separated from the locking plate in a vertical direction. However, in the course of locking the above-mentioned locking structure, the spring bolt is driven by pulling the pull component to first retract into the spring bolt base. After the spring bolt reaches a position below the spring plate, the pull component is released and the spring bolt stretches into the locking plate to lock the truck bed. Therefore, the locking process is complicated and the manipulation is cumbersome.

SUMMARY

To address the technical issues where a truck bed cover locking device in the prior art has a complicated locking process and a cumbersome manipulation, the present disclosure provides a truck bed cover locking device, a truck bed, and a truck to address the above-mentioned technical issues. The technical solutions of the present disclosure are described as follows.

A truck bed cover locking device includes a latch structure. The latch structure is detachably mounted on a truck bed body. The latch structure includes a limit portion extending toward a latch locking component. The limit portion includes a limit surface and a tilted surface. The tilted surface is located above the limit surface. The tilted surface tilts downward in a direction approaching the latch locking component. The truck bed cover locking device further includes the latch locking component. The latch locking component is provided on the truck bed cover. The latch locking component includes a retractable plunger and a reset component. The plunger contacts the tilted surface at a point. Under the action of gravity, the plunger is compressed and slides downward. When the plunger slides to a position below the limit surface, at least a part of the plunger stretches out to a position below the limit surface under the action of the reset component.

By the arrangement of the limit portion of the latch structure including the tilted surface and the limit surface, when the truck bed cover is locked, the plunger first falls and contacts the tilted surface. Under the action of gravity, the plunger is compressed and slides downward along the tilted surface. When the plunger slides to a position below the reset component, the plunger stretches out to a position below the limit surface, realizing an automatic locking under the action of gravity without the need of a manual operation, which is of convenience.

Further, a lower end of the tilted surface is connected to the limit surface or is connected to the limit surface through a transitional surface. A protruded surface extends from a higher end of the tilted surface. A surface of the truck bed cover facing toward the protruded surface is provided with a limit structure fitted with the protruded surface.

Further, the limit structure is a groove. A shape of the groove is matched with a shape of the protruded surface.

Further, the latch structure is mounted on the truck bed body through a clamp block component. The clamp block component is hooked to and tightly clamps the truck bed body. The latch structure is adjustably provided on the clamp block component.

Further, the clamp block component includes an inner clamp block and an outer clamp block. An upper end of the inner clamp block is hooked to an inner wall of the truck bed body. The inner clamp block and the outer clamp block tightly clamp the truck bed body through a fixing component. An inner surface of the inner clamp block is provided with a first press surface. The latch structure further includes a mounting portion. A second press surface and a strip-like hole are provided on the mounting portion. The fixing component passes through the strip-like hole to fix the latch structure on the clamp block component by tightly pressing and fixing the second press surface on the first press surface.

Further, the first press surface and the second press surface are toothed surfaces meshing with each other.

Further, an outer end of the plunger is spherical.

Further, the plunger is mounted on the truck bed cover through a plunger base. The plunger is provided inside the plunger base in a sliding manner. The reset component is sleeved on the plunger. The outer end of the plunger stretches out of the plunger base under the action of the reset component. An inner end of the plunger is connected to a pull rope.

A truck bed includes the above-mentioned truck bed cover locking device.

A truck includes the above-mentioned truck bed.

Based on the above-mentioned technical solutions, the present disclosure can realize technical effects as follows.

According to the truck bed cover locking device of the present disclosure, by the arrangement of the limit portion of the latch structure including the tilted surface and the limit surface, when the truck bed cover is locked, the plunger first falls and contacts the tilted surface. Under the action of gravity, the plunger is compressed and slides downward along the tilted surface. When the plunger slides to the position below the reset component, the plunger stretches out to the position below the limit surface, realizing the automatic locking under the action of gravity without the need of the manual operation, which is very convenient.

According to the truck bed cover locking device of the present disclosure, the latch structure further includes the protruded surface. The limit structure is correspondingly provided on the protruded surface and the truck bed cover in order to limit the truck bed cover in a horizontal direction and to prevent the truck bed cover from moving/waggling in the horizontal direction. The limit structure is designed as a long groove to prevent the truck bed cover from waggling forth and back. The limit structure is designed as the groove is matched with the shape of the protruded surface to prevent the truck bed cover from waggling forth and back, or left and right, which further ensures the truck bed cover covers on the truck bed body.

According to the truck bed cover locking device of the present disclosure, the latch structure is mounted on the truck bed body through the clamp block component. The latch structure is not directly connected to the truck bed body, so an original structure of the truck bed body will not be changed. Moreover, the latch structure is mounted through the clamp block component, which facilitates disassembly. The press surfaces are provided on both the mounting portions of the clamp block component and the latch structure. By tightly pressing the two press surfaces, a relative slide is unlikely to occur between the clamp block component and the latch structure which forms and obtains a stable and firm connection. The mounting portion is further provided with the strip-like hole and the fixing component passes through the strip-like hole to connect the latch structure and the clamp block component. Coupled with the two press surfaces, a height of the latch structure relative to the clamp block component is adjustable and the latch structure can be stably mounted at different heights.

According to the truck bed cover locking device of the present disclosure, the plunger head of the plunger is designed to be spherical and the plunger head contacts the tilted surface at the point, which can realize a point contract between the plunger and the tilted surface. In this way, the friction force between the plunger and the tilted surface is small. The plunger can be compressed and slide downward along the tilted surface under the action of gravity, so as to realize automatic locking.

According to the truck bed and the truck of the present disclosure, the above-mentioned truck bed cover locking device can stably and firmly fix the truck bed cover fixed on the truck bed body, so that the truck bed cover is not likely to waggle and fall off the truck bed body. Moreover, the automatic locking can be realized in the course of locking.

Figure 1:
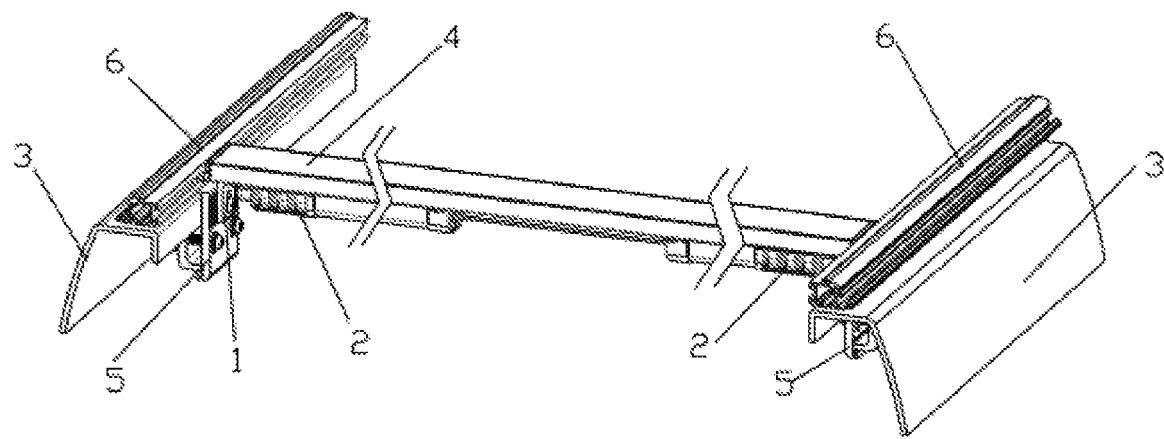
FIG. 1 is a structural schematic diagram showing a truck bed cover locking device of the present disclosure.
Figure 2:
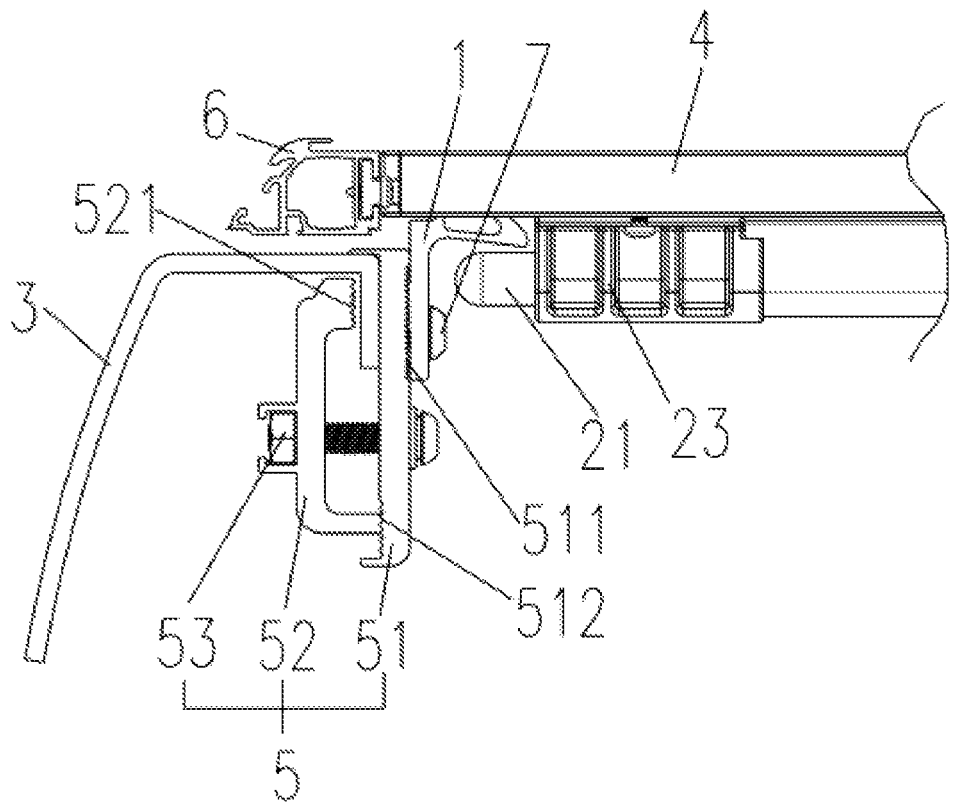
FIG. 2 is a front view of the truck bed cover locking device.

In the figures: 1—latch structure; 11—limit portion; 111—tilted surface; 112—limit surface; 113—protruded surface; 114—transitional surface; 12—mounting portion; 121—second press surface; 122—strip-like hole; 2—latch locking component; 21—plunger; 22—reset component; 23—plunger base; 24—pull rope; 3—truck bed body; 4—truck bed cover; 41—limit structure; 5—clamp block component; 51—inner clamp block; 511—first press surface; 512—third press surface; 52—outer clamp block; 521—fourth press surface; 53—fastener; 6—side rail; 7—fixing component.

DETAILED DESCRIPTION OF THE EMBODIMENTS

The contents of the present disclosure are further described hereinafter with reference to the drawings. In the description of the present disclosure, it should be understood that the terms "radial", "axial", "upper", "lower", "top", "bottom", "inner" and "outside" indicate orientations or positional relationships based on the orientation or positional relationships shown in the drawings and are intended to merely facilitate the understanding of the description of the present disclosure and simplify the description, rather than indicating or implying that the device or component referred to has a specific orientation and is constructed or operated in a specific orientation. Therefore the terms should not form a limit to the present disclosure. In the description of the novelty of the disclosure, "plurality" means two or more unless otherwise stated.

In the description of the present disclosure, it should be noted that the terms "mount", "provide", and "connect" should be understood broadly, unless otherwise explicitly defined and limited. For example, devices may be fixedly connected, detachably connected, or integrally connected. The devices also can be connected directly or indirectly, or connected through an intermediate medium. For those ordinary person skilled in the art, the specific meanings of the above terms in the present disclosure can be understood according to a specific case.

As shown in FIGS. 1-5, the present embodiment provides a truck bed cover locking device which includes the latch structure 1 and the latch locking component 2. The latch structure 1 is provided on the truck bed body 3. The latch locking component 2 is provided on the truck bed cover 4. The latch structure 1 and the latch locking component 2 collaboratively realize that the truck bed cover 4 is tightly locked on the truck bed body 3.

The latch structure 1 is adjustably and detachably provided on the truck bed body 3. The latch structure 1 includes the limit portion 11 and the mounting portion 12. The limit portion 11 and the mounting portion 12 can be integrally formed or fixedly connected. The limit portion 11 and the latch locking component 2 collaboratively lock the truck bed cover 4 tightly. The mounting portion 12 is connected to the truck bed body 3. Specifically, the limit portion 11 extends toward the latch locking component 2. The limit portion 11 includes the tilted surface 111 and the limit surface 112. The tilted surface 111 is located above the limit surface 112 and the tilted surface 111 tilts along a direction approaching the latch locking component 2. A lower end of the tilted surface 111 can be directly connected to the limit surface 112 or can be connected to the limit surface 112 through the transitional surface 114. A middle portion of the transitional surface 114 extends in a vertical direction. Two ends of the transitional surface 114 are respectively connected to the tilted surface 111 and the limit surface 112. The round corners are provided on the two ends of the transitional surface 114 to realize a smooth transition between the tilted surface 111 and the limit surface 112. The protruded surface 113 extends from a higher end of the tilted surface 111. The protruded surface 113 may be a horizontal surface and a smooth transition is provided between the protruded surface and the tilted surface 111. The limit surface 112 is a lower surface of the limit portion 11. The limit surface 112 may be a plane or an inclined plane slightly extending downward, so that the limit surface 112 and the latch locking component 2 can form a point contact, which reduces a contact area. Preferably, the limit portion 11 may have a hollow structure so as to reduce the usage of material and the weight of the latch structure 1.

Figure 3:
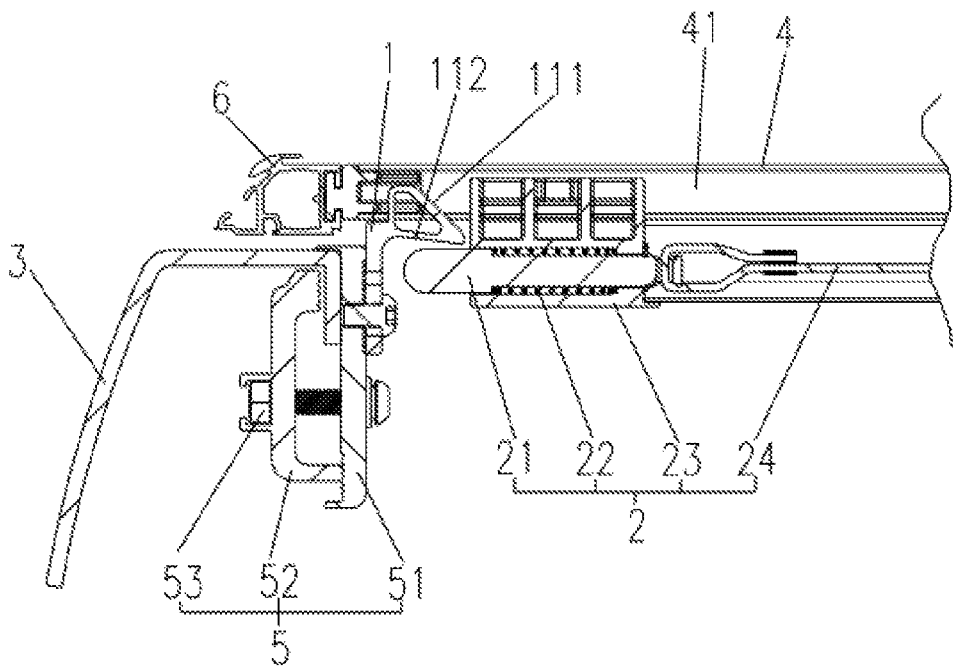
FIG. 3 is a sectional view of the truck bed cover locking device.
Figure 4:
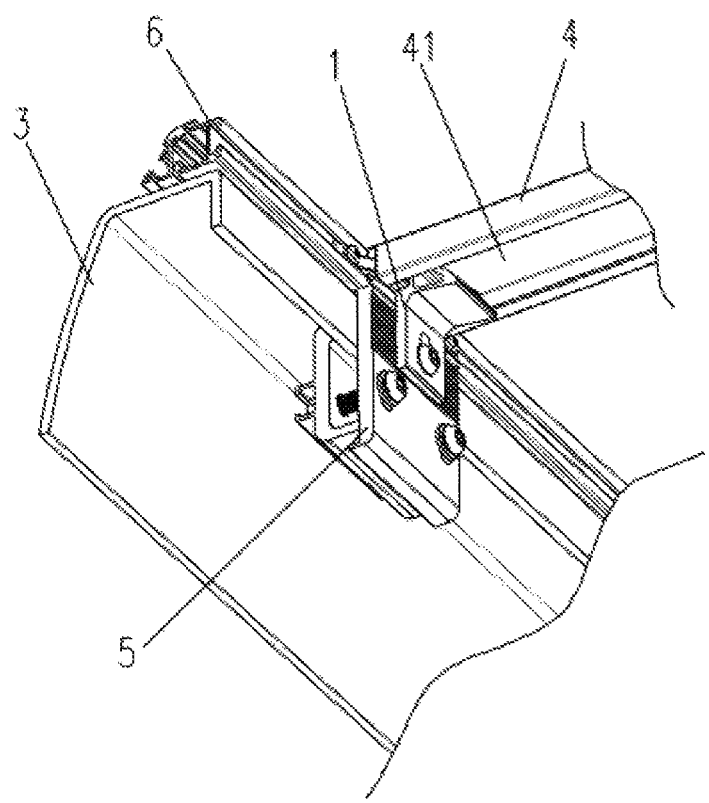
FIG. 4 is a schematic diagram showing a limit structure of a latch structure inserted into the truck bed cover.
Figure 5:
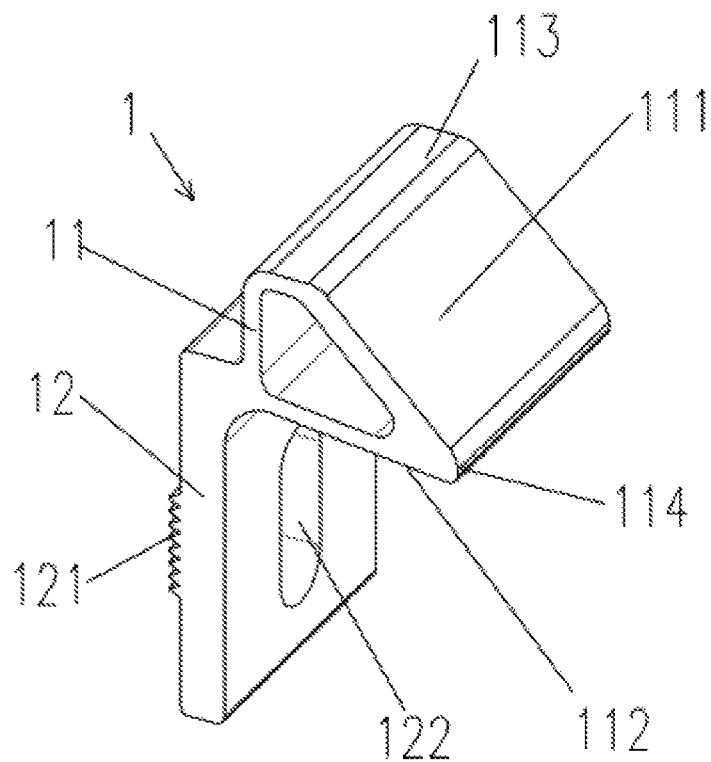
FIG. 5 is a structural schematic diagram of the latch structure.

Preferably, the protruded surface 113 protrudes toward the truck bed cover 4. Correspondingly, a surface on the truck bed cover 4 facing toward the protruded surface 113 is provided with the limit structure 41 fitted with the protruded surface 113. As shown in FIGS. 3-4, the limit structure 41 has a groove structure. The limit structure 41 may be designed as a long groove. The protruded surface 113 is inserted into the long groove-shaped limit structure to prevent the truck bed cover 4 from waggling forth and back. Further, the limit structure 41 can be designed as a groove matched with a shape of the protruded surface 113. The protruded surface 113 is inserted into the groove to prevent the truck bed cover 4 from waggling forth and back, or left and right.

The mounting portion 12 of the latch structure 1 may extend in a vertical direction. The second press surface 121 is provided on an outer surface of the mounting portion 12 of the latch structure 1. The mounting portion 12 is provided with the strip-like hole 122. The strip-like hole 122 extends along the vertical direction. The height of the latch structure 1 can be adjusted by tightly pressing the second press surface 121 at different heights and then the latch structure 1 of different heights is fixed by the fixing component 7 passing through different positions of the strip-like hole 122.

The latch structure 1 is detachably and adjustably provided on the truck bed body 3 through the clamp block component 5. The clamp block component 5 includes the inner clamp block 51 and the outer clamp block 52. The inner clamp block 51 and the outer clamp block 52 are tightly clamped on a side wall of the truck bed body 3 through the fastener 53. The latch structure 1 is provided on the inner clamp block 51. Specifically, an upper end of the inner clamp block 511 is hooked to and closely abuts an inner surface of the side wall of the truck bed body 3. An upper end of the outer clamp block 52 closely abuts the outer surface of the side wall. A lower end of the outer clamp block 52 abuts against the lower end of the inner clamp block 51. The fastener 53 passes through the inner clamp block 51 and the outer clamp block 52 to tightly clamp the inner clamp block and the outer clamp block onto the truck bed body 3. Preferably, the upper end of the outer clamp block 52 is provided with the fourth press surface 521. The lower end of the inner clamp block 51 is provided with the third press surface 512. The fourth press surface 521 is tightly pressed on the truck bed body 3 and the third press surface 512 abuts against the lower end of the outer clamp block 52, which increases the friction force between the contact areas. Therefore, the clamping is more stable and firm, and is unlikely to be detached.

An inner surface of the upper end of the inner clamp block 51 is provided with the first press surface 511. The second press surface 121 on the mounting portion 12 is tightly pressed on the first press surface 511. The fixing component 7 passes through the strip-like hole 122 to tightly and firmly connect the mounting portion 12 and the inner clamp block 51 together. Preferably, the first press surface 511, the second press surface 121, the third press surface 512, and the fourth press surface 521 are all toothed surfaces. Further, the first press surface is an inward recessed toothed surface. The second press surface 121 is an outward protruded toothed surface, namely, the teeth of the first press surface 511 do not protrude out of the inner surface of the inner clap block 51. The teeth of the second press surface 121 protrude out of the outer surface of the mounting portion 51. The first press surface 511 and the second press surface 121 mesh with each other. Further, an extending length of the first press surface 511 is larger than an extending length of the second press surface 121. In this way, the second surface 121 can mesh with different positions of the first press surface 511 at different heights, so as to realize the adjustment of the height of the latch structure 1.

The latch locking component 2 is provided on the truck bed cover 4. The latch locking component 2 includes the plunger 21, the reset component 22, the plunger base 23, and the pull rope 24. The plunger 21 is mounted on the truck bed cover 4 through the plunger base 23. Specifically, the plunger base 23 is fixedly connected to the truck bed cover 4. The plunger 21 is provided inside the plunger base 23 in a sliding manner. The reset component 22 is sleeved on the plunger 21. An outer end of the plunger 21 stretches out of the plunger base 23 under the action of the reset component 22 and stretches or retracts toward the latch structure 1. An inner end of the plunger 21 is connected to the pull rope 24. The pull rope 24 can pull the plunger 21 to overcome the action force of the reset component 22, making the outer end of the plunger 21 retract toward the plunger base 23. If the truck bed cover 4 needs to be tightly locked to make the truck bed cover 4 cover on the truck bed body 3, the plunger 21 stretches out of the plunger base 23 under the action of the reset component 22 and at least a part of the plunger 21 moves to a position below the limit surface 112. A vertical position of the plunger 21 is limited by the limit surface 112. Preferably, the limit surface 112 extends toward the plunger 21 and an extending length of the limit surface 112 is not less than a length where the plunger 21 moves to the position below the limit surface 112. In this way, an outermost end of the plunger 21 will not contact with the latch structure 1, thereby protecting the latch structure 1 from crashing and damage. Further, the limit surface 112 extends toward the plunger 21 and the extending length of the limit surface 112 is larger than the length where the plunger 21 moves to the position below the limit surface 112. The reset component 22 may include but is not limited to a spring.

Preferably, an extending length of the tilted surface needs to satisfy the condition when the plunger 21 falls from a position above the latch structure 1, the plunger 21 contacts the tilted surface 111, is compressed and slides downward along the tilted surface 111 to the position below the limit surface 111. Then the plunger 21 stretches out to the position below the limit surface 111 under the action of the reset component 22. Further, the outer end of the plunger 21 is spherical, which facilitates to form a point contact with the tilted surface 111, which reduces the friction force between the plunger 21 and the tilted surface 111 and enables the plunger 21 to readily compress and slide downward.

Based on the above-mentioned structures, when the truck bed cover locking device of the present embodiment is locked, the plunger 21 falls along with the truck bed cover 4. After falling, the plunger 21 contacts the tilted surface at a point. The plunger 21 is compressed and slides downward along the tilted surface 111 under the action of gravity. When the plunger 21 slides toward the limit surface 112, the plunger 21 stretches out to the position below the limit surface 112 under the action of the reset component 22, realizing an automatic locking under the action of gravity. When the truck bed locking device is unlocked, the pull rope 24 is pulled to make the plunger 21 overcome the action force of the reset component 22 and retract toward the plunger base 23. Subsequently, the truck bed cover 4 is lifted upward to unlock the truck bed locking device.

The present embodiment further provides a truck bed which includes the truck bed body 3, the truck bed cover 4 and the above-mentioned truck bed locking device. The truck bed locking device is configured to stably lock the truck bed cover 4 to protect objects in the truck bed. Further, the latch structures 1 are provided on both side walls of the truck bed body 3. Two ends of the truck bed cover 4 corresponding to the latch structures 1 are all provided with the latch locking component 2. The pull rope 24 can simultaneously control the latch locking components 2 on two sides. Further, the side rails 6 are connected to two sides of the truck bed cover 4. The side rails 6 covering the outer end of the truck bed body 3 are configured to further protect the objects in the truck bed.

The present embodiment further provides a trunk which includes the above-mentioned truck bed. The above-mentioned truck bed is configured to protect the objects in the truck bed from being damaged.

The embodiments of the present disclosure are described in detail with reference to the drawings as above. However, the present disclosure is not limited to the above-mentioned embodiments. An ordinary person skilled in the art can make various changes without departing from the purposes of the present disclosure based on the knowledge in the art.

What is claimed is:

1. A truck bed cover locking device comprising:
a latch structure, wherein the latch structure is detachably mounted on a truck bed body, the latch structure comprises a limit portion extending toward a latch locking component, the limit portion comprises a limit surface and a tilted surface, the tilted surface is located above the limit surface, the tilted surface tilts downward in a direction approaching the latch locking component; and
the latch locking component, wherein the latch locking component is provided on a truck bed cover, the latch locking component comprises a retractable plunger and a reset component, the retractable plunger contacts the tilted surface at a point, under an action of gravity, the retractable plunger is compressed and slides downward and when the retractable plunger slides to a position below the limit surface, at least a part of the retractable plunger stretches out to a position below the limit surface under an action of the reset component,
wherein a lower end of the tilted surface is directly connected to the limit surface or is connected to the limit surface through a transitional surface, a protruded surface extends from a higher end of the tilted surface, and a surface of the truck bed cover facing toward the protruded surface is provided with a limit structure fitted with the protruded surface.

2. The truck bed cover locking device according to claim 1, wherein the limit structure is a groove, and a shape of the groove is matched with a shape of the protruded surface.

3. The truck bed cover locking device according to claim 1, wherein the latch structure is mounted on the truck bed body through a clamp block component, the clamp block component clamps the truck bed body, the latch structure is adjustably provided on the clamp block component.

4. The truck bed cover locking device according to claim 3, wherein the clamp block component comprises an inner clamp block and an outer clamp block, an upper end of the inner clamp block is hooked to an inner wall of the truck bed body, the inner clamp block and the outer clamp block clamp the truck bed body through a fastener, an inner surface of the inner clamp block is provided with a first press surface, the latch structure further comprises a mounting portion, a second press surface and a strip-like hole are provided on the mounting portion, a fixing component passes through the strip-like hole to fix the latch structure on the clamp block component by pressing and fixing the second press surface on the first press surface.

5. The truck bed cover locking device according to claim 4, wherein the first press surface and the second press surface are toothed surfaces meshing with each other.

6. The truck bed cover locking device according to claim 1, wherein an outer end of the plunger is spherical.

7. The truck bed cover locking device according to claim 1, wherein the retractable plunger is mounted on the truck bed cover through a plunger base, the retractable plunger is provided inside the plunger base in a sliding manner, the reset component is sleeved on the plunger, the outer end of the retractable plunger stretches out of the plunger base under an action of the reset component, an inner end of the retractable plunger is connected to a pull rope.

8. A truck bed comprising the truck bed cover locking device according to claim 1.

9. A truck comprising the truck bed according to claim 8.

10. The truck bed cover locking device according to claim 6, wherein the retractable plunger is mounted on the truck bed cover through a plunger base, the retractable plunger is provided inside the plunger base in a sliding manner, the reset component is sleeved on the plunger, the outer end of the retractable plunger stretches out of the plunger base under an action of the reset component, an inner end of the retractable plunger is connected to a pull rope.

11. The truck bed according to claim 1, wherein the limit structure is a groove, and a shape of the groove is matched with a shape of the protruded surface.

12. The truck bed according to claim 8, wherein the latch structure is mounted on the truck bed body through a clamp block component, the clamp block component tightly clamps the truck bed body, the latch structure is adjustably provided on the clamp block component.

13. The truck bed according to claim 12, wherein the clamp block component comprises an inner clamp block and an outer clamp block, an upper end of the inner clamp block is hooked to an inner wall of the truck bed body, the inner clamp block and the outer clamp block clamp the truck bed body through a fastener, an inner surface of the inner clamp block is provided with a first press surface, the latch structure further comprises a mounting portion, a second press surface and a strip-like hole are provided on the mounting portion, a fixing component passes through the strip-like hole to fix the latch structure on the clamp block component by pressing and fixing the second press surface on the first press surface.

14. The truck bed cover locking device according to claim 13, wherein the first press surface and the second press surface are toothed surfaces meshing with each other.

15. The truck bed cover locking device according to claim 8, wherein an outer end of the plunger is spherical.

16. The truck bed cover locking device according to claim 8, wherein the retractable plunger is mounted on the truck bed cover through a plunger base, the retractable plunger is provided inside the plunger base in a sliding manner, the reset component is sleeved on the plunger, the outer end of the retractable plunger stretches out of the plunger base under an action of the reset component, an inner end of the retractable plunger is connected to a pull rope.

17. The truck bed cover locking device according to claim 15, wherein the retractable plunger is mounted on the truck bed cover through a plunger base, the retractable plunger is provided inside the plunger base in a sliding manner, the reset component is sleeved on the plunger, the outer end of the retractable plunger stretches out of the plunger base under an action of the reset component, an inner end of the retractable plunger is connected to a pull rope.

* * * * *